United States Patent [19]
Tutt

[11] Patent Number: 5,841,581
[45] Date of Patent: Nov. 24, 1998

[54] METHOD AND APPARATUS FOR MAKING A SPATIALLY SELECTIVE HIGH RESOLUTION LIGHT FILTER

[75] Inventor: Lee W. Tutt, Webster, N.Y.

[73] Assignee: Eastman Kodak Company, Rochester, N.Y.

[21] Appl. No.: 611,354

[22] Filed: Mar. 5, 1996

Related U.S. Application Data

[63] Continuation of Ser. No. 259,826, Jun. 15, 1994, abandoned.

[51] Int. Cl.$^6$ ........................................................ G02B 5/30
[52] U.S. Cl. ............................ 359/489; 359/501; 359/900
[58] Field of Search ............................ 359/489, 501, 359/900; 362/19; 283/90; 264/1.31, 1.34, 1.37

[56] References Cited

U.S. PATENT DOCUMENTS

| | | | |
|---|---|---|---|
| 2,440,105 | 4/1948 | Land et al. | 359/489 |
| 2,617,329 | 11/1952 | Dreyer | 359/489 |
| 2,882,631 | 4/1959 | Boone | 359/489 |
| 2,887,007 | 5/1959 | Ryan | 359/489 |
| 3,241,960 | 3/1966 | Mahler | 359/489 |
| 3,348,217 | 10/1967 | Snaper | 359/489 |
| 5,033,829 | 7/1991 | Faroughy | 359/501 |
| 5,101,296 | 3/1992 | Bell | 359/489 |
| 5,284,364 | 2/1994 | Jain | 359/489 |
| 5,327,285 | 7/1994 | Faris | 359/489 |
| 5,398,131 | 3/1995 | Hall et al. | |

FOREIGN PATENT DOCUMENTS

| | | | |
|---|---|---|---|
| 935399 | 11/1955 | Germany | 359/489 |
| 62-151803 | 7/1987 | Japan | 359/489 |
| 94/10621 | 5/1994 | WIPO | 359/489 |

*Primary Examiner*—Ricky D. Shafer
*Attorney, Agent, or Firm*—J. Randall Beckers

[57] ABSTRACT

A method and apparatus that bonds two orthogonally polarized plastic films into a single sheet, self aligned, orthogonally polarized filter. A laser heats regions of the films to depolarize localized regions in layers of the films, creating regions of different polarization that transmit only correspondingly polarized light, regions of complete depolarization which transmit all light, and regions of complete polarization which block light. The regions of varying polarization are produced by a computer controlled laser beam scanner and halfwave plate scanning a polarized laser beam light across the filter, such that the light is absorbed by regions of one of the films of the filter of opposite polarization, heating the film and depolarizing the regions of the layer absorbing the light.

6 Claims, 4 Drawing Sheets

METHOD AND APPARATUS FOR MAKING A SPATIALLY SELECTIVE HIGH RESOLUTION LIGHT FILTER

CROSS REFERENCE TO RELATED APPLICATION

This is a Continuation of application U.S. Ser. No. 08/259,826, filed 15 Jun. 1994, now abandoned.

This application is related to U.S. application entitled Method And Apparatus For Producing A Three-Dimensional Color Image by the inventor hereof, having U.S. Ser. No. 08/259,802 and concurrently filed herewith and incorporated by reference herein.

BACKGROUND OF THE INVENTION

1. Field of the Invention

The present invention is directed to a system for making a visible light filter that spatially controls polarized light and, more particularly, to making a filter that includes regions of different and orthogonal polarizations that can be used for three dimensional imaging.

2. Description of the Related Art

A number of methods have been used to yield spatial polarization of visible light. Most of these methods require a liquid crystal device which becomes polarized in the presence of an electrical field. The ubiquitous digital liquid crystal device (LCD) watches are one example which uses spatial polarization to darken the numbers. Liquid crystal light valves for projection optics are another example. All of these devices are active in that they require electric circuitry to generate the spatial polarization. Each individual region that is to be polarized must have an electric circuit connected to it which adds complexity and lowers reliability.

For direct view applications (such as computer screens) and projection of 3-dimensional (3-D) images, it is desirable to provide a simple system. For these devices, a spatial polarization image which is constant may be acceptable. Computer screens designed to generate 3-D images have been outfitted with liquid crystal filters which alternate between two orthogonal polarizations while the screen alternates between two images, conventionally left and right eye images. Glasses having a pair of orthogonally polarized lenses are used with the alternate image projection system to provide a different image to each eye. For projection applications, the two images, which are filtered with orthogonal polarizations, are projected and combined by the brain of the user wearing the glasses. Such a system requires two projectors and alignment of the images.

What is needed is a system that produces spatial polarization of visible light that does not require control electronics and that does not require alignment of two images. A process that yields a filter which can be placed over a video screen or a projector to give the correct polarization in a passive manner and requires only standard projection equipment is also needed.

SUMMARY OF THE INVENTION

It is an object of the present invention to produce a high resolution, spatially selective, orthogonally polarized visible light filter.

It is another object of the present invention to provide a passive filter that can be used for three dimensional image projection that does not require control electronics and does not require alignment of two images.

It is a further object of the present invention is to provide a system that creates a spatially polarized filter that is simple in construction and simple to use.

The above objects can be attained by a method and apparatus that bonds a pair of orthogonally polarized films into a single sheet, orthogonally polarized filter. A laser and a laser light polarizer is then used to heat spatially alternating regions of the films to depolarize the films and create regions of alternating polarization in the filter. The filter can also be created with regions of complete depolarization, such that light of any polarization can pass therethrough, and regions of complete polarization, such that substantially no light passes therethrough. The regions of varying polarization are produced by a computer controlled laser beam scanner that scans a laser beam across the filter through a laser light polarizer, such that polarized light produced during scanning of the filter is absorbed by regions of one of the films of the filter, heating the film and depolarizing the regions.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
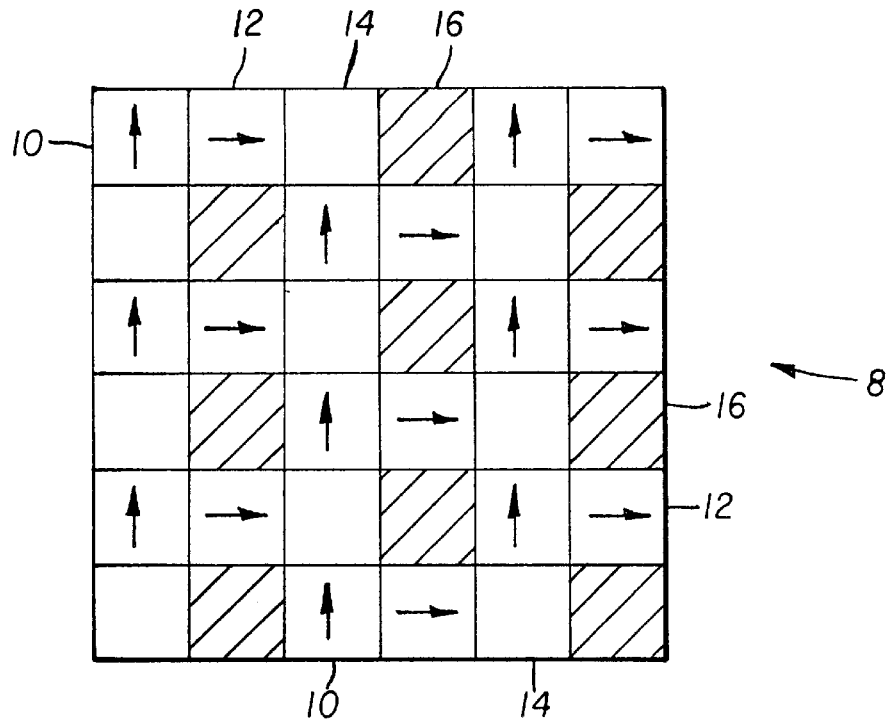
FIG. 1 illustrates a first embodiment of a filter 8 produced in accordance with the present invention.

A filter 8 in accordance with the present invention can spatially comprise four types of regions as illustrated in FIG. 1. The first type region 10 has a polarization which is oriented in a first direction, for example vertical as depicted by the arrow pointing upward in FIG. 1. The second region 12 has a polarization which is orthogonal to the first region, for example horizontal, as depicted by the arrow pointing sideways in FIG. 1, such that the first two types of regions are mutually orthogonally polarized. The third type region 14 can be a region of complete transparency in which the filter 8 is not polarized. The fourth type region 16 can be a region in which orthogonal polarization exists (for example, both vertical and horizontal) and which is highly light absorbent.

Figure 2:
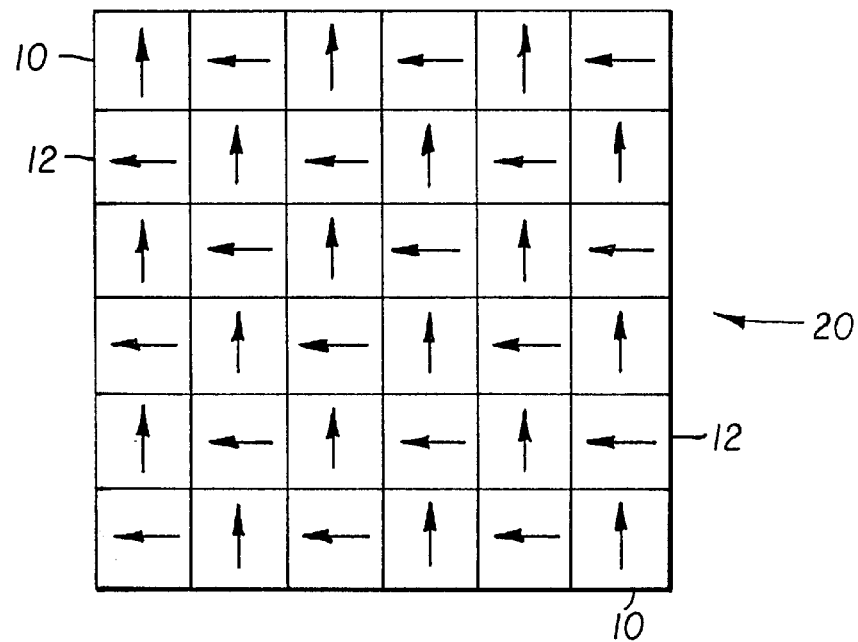
FIG. 2 illustrates a second embodiment of a filter 20 designed for use in a 3-D projection system.

FIG. 2 illustrates a second embodiment of a filter 20 in accordance with the present invention and which only includes the first two types of regions 10 and 12 and which can be used for 3-D image projection, as discussed in more detail in the related application previously mentioned.

The process of generating a filter as illustrated in FIGS. 1 and 2 involves direct addressing or exposing two laminated or bonded, cross polarized films to polarized laser light, although high intensity, highly focused polarized broad spectrum light can be used instead of the laser light. Absorption occurs only in one of the polarized films which is thereby heated up to a point above its depolarization temperature, so that locally an unpolarized region of the polarized film is produced. By exposing a region with only light polarized in a first direction the first type region 10 is created. By exposing a region with light polarized in a second direction the second type region 12 is created. By exposing a region with light polarized in the first direction and then with light polarized in the second direction, the third type region 14 is created because both of the cross polarized and laminated film layers are heated to the depolarization temperature. By not exposing a region to light of either polarization the fourth type region 16 is created.

Figure 3:
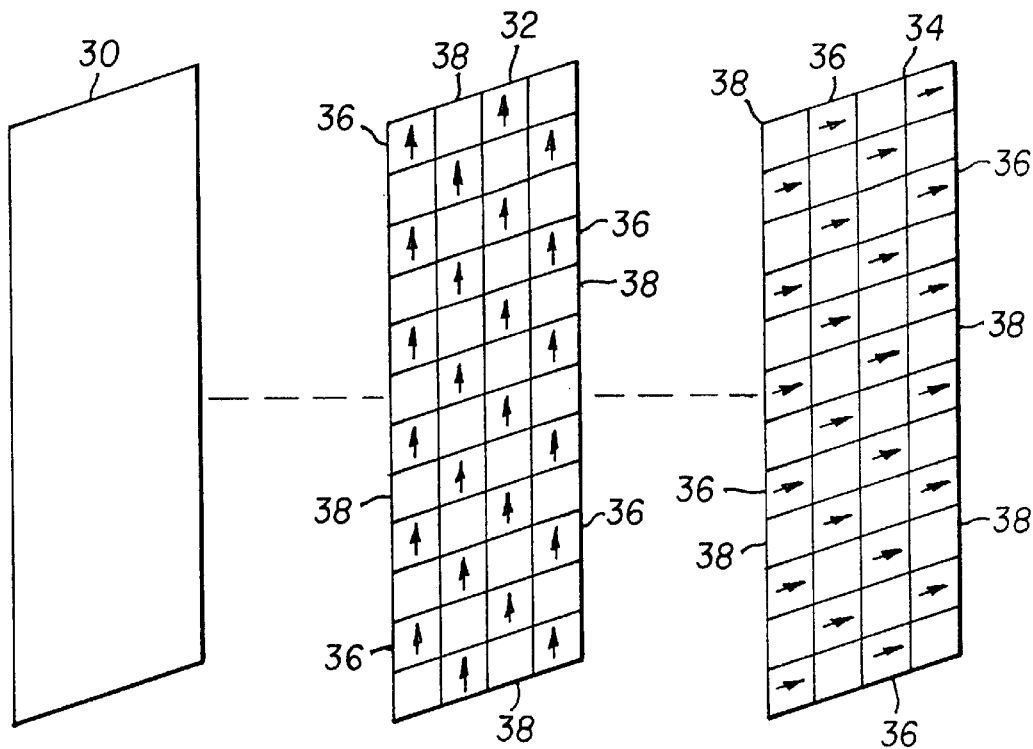
FIG. 3 is an exploded view of the filter 20 of FIG. 2.

An exploded view of the filter 20 of FIG. 2 is depicted in FIG. 3. The filter comprises two layers 32 and 34. A third layer 30 can be added and is an image carrier substrate which, as discussed in the related application, can have a 3-D image transferred thereto. Layer 32 is a conventional polarized plastic film, such as a 7 mil (175 $\mu$m) polarizer film available from Edmund Scientific Co. of Barrington, N.J., in which regions have been depolarized by laser light heating. The layer 32 is oriented so that the polarization axis is vertical. Layer 34 is also a conventional polarized plastic film as noted above but with the polarization axis oriented horizontally and which also includes depolarized regions. Regions 36 of each of the layers 32 and 34 are areas of each film where the polarization has been maintained by not heating the area and regions 38 are areas where the films have been heated to depolarize the areas. Since the film layers 32 and 34 are laminated together prior to heating the regions 36 and 38 align to form the regions 10 and 12 shown in FIG. 2.

Figure 4:
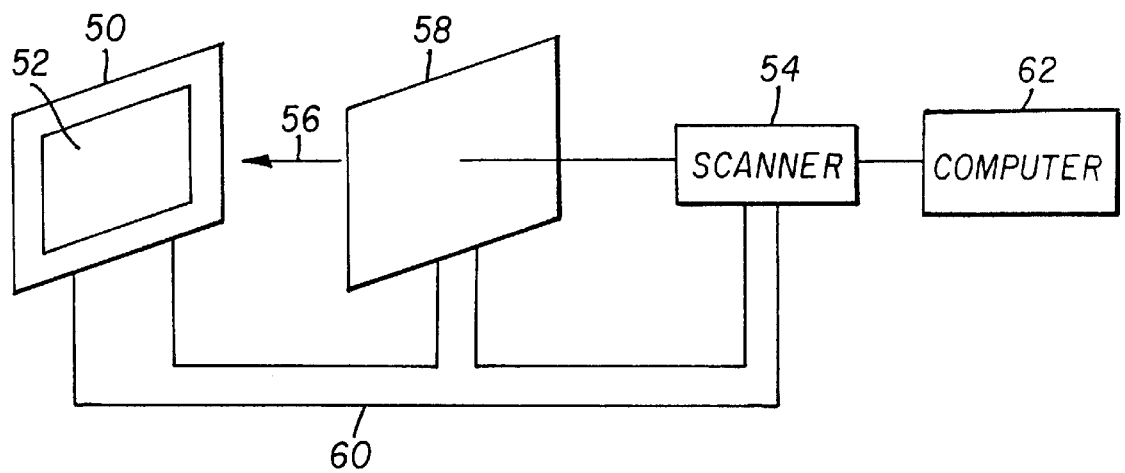
FIG. 4 illustrates the hardware used to create the filters 8 and 20.

The filters 8 and 20 of FIGS. 1 and 2 can be created with an apparatus as illustrated in FIG. 4. A conventional mechanical translation frame 50 holds the laminated filter 52 which is exposed to create the filters 8/20. A conventional scanning laser system 54, with a laser available from Hitachi of Japan, projects a scanned laser beam 56 onto the filter 52 through a conventional halfwave plate 58 which phase shifts (rotates the polarization of) the beam 56. A conventional jig 60 connected to the frame 50, scanner system 54 and plate 58 holds the components in constant alignment. The scanner 54 is controlled by a computer 62 which uses a scan mask or matrix to control turning the laser of the scanner 54 on and off as the beam 56 is raster scanned across the filter 52. As discussed in more detail below, by scanning the beam 56 across the filter 52 and alternately turning the beam on and off in a first pattern, rotating the plate 58 and then scanning the beam with a second on and off pattern the alternating regions of polarization 10 and 12, as depicted in FIG. 2, can be created. With overlapping on and off first and second patterns the regions 10, 12, 14 and 16 of FIG. 1 can be created.

Figure 5:
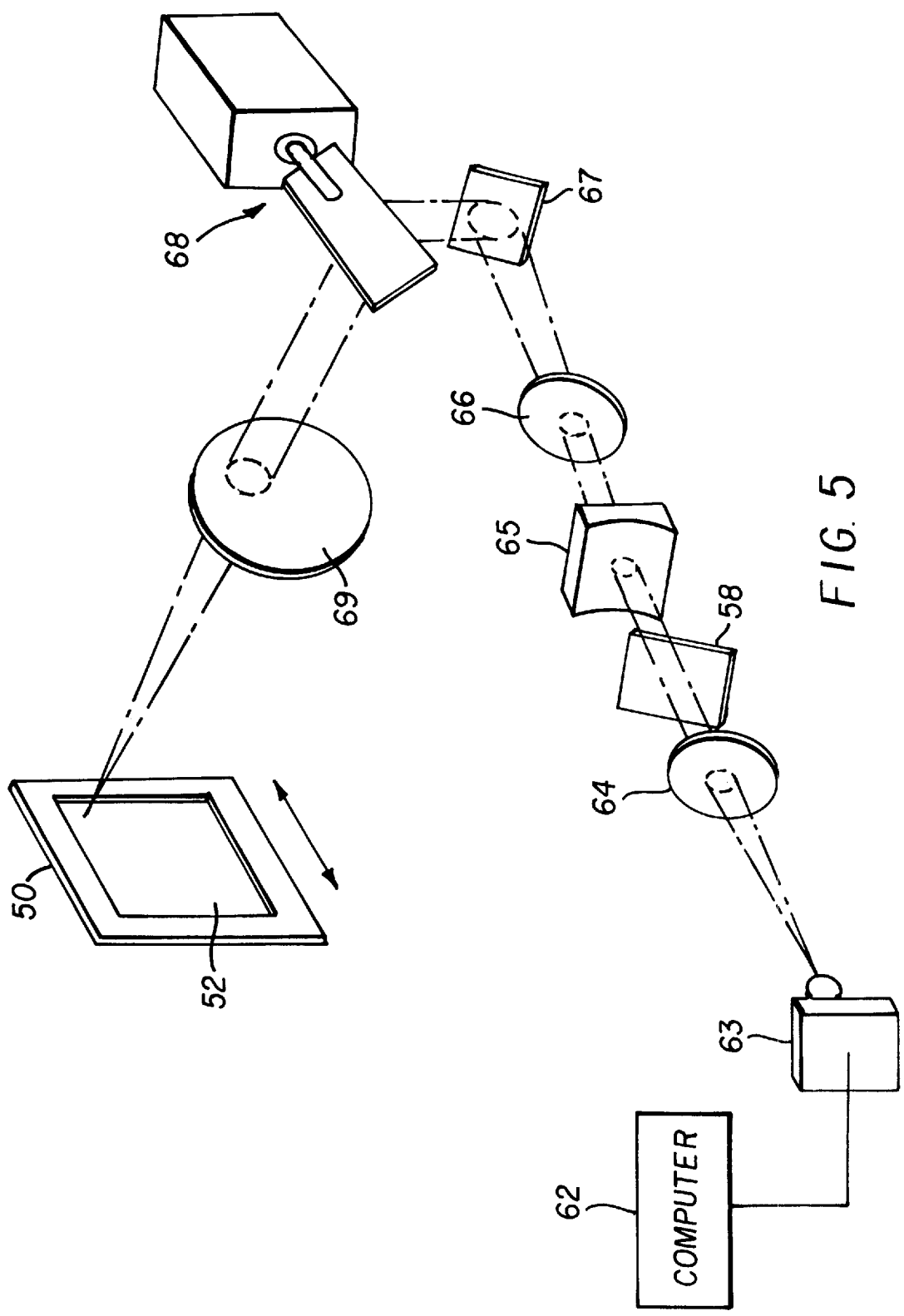
FIG. 5 depicts the components of the scanner in their relationship to the other hardware in greater detail.

As illustrated in more detail in FIG. 5, the laser scanning system includes a diode laser 63 projecting a beam through a collimating lens 64, through halfwave plate 58, through beam shaping lenses 65 and 66 and onto a mirror 67. The beam reflected from the mirror 67 is scanned by a galvonometer mirror combination 68 through an object lens 69 toward the filter 52.

Figure 6:
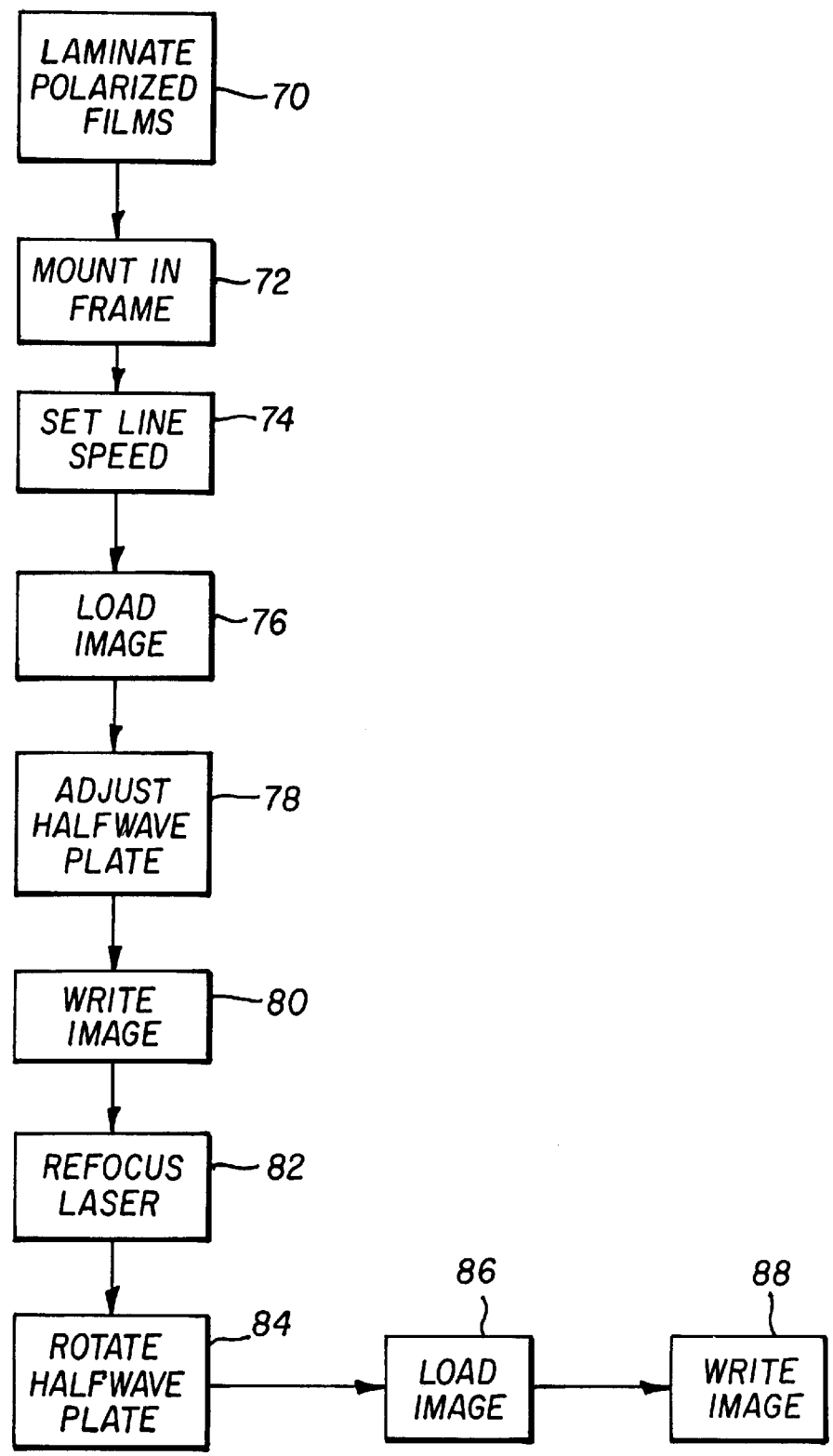
FIG. 6 depicts the steps of the process of the present invention.

The process of the present invention begins, as illustrated in FIG. 6, with the lamination 70 of two orthogonally polarized film layers, such as two layers of the Edmund Scientific plastic film previously mentioned. The layers can be laminated together using a thermal lamination process as long as the lamination temperature does not reach the film depolarization temperature. Alternately and preferably the layers can be glued together. For example, conventional super glue is applied to one side of a piece of polarized film. A second piece of polarized film, with the polarization axis oriented orthogonally to the first polarized film, is pressed firmly against the super glue film. The super glue needs to be of sufficient quantity to completely cover the area between the polarized films with no air bubbles. The resulting filter appears dark blue when held toward a strong light source due to virtually complete light absorption.

The second step is to mount 72 the laminated films in the frame 50. The focal plane of the laser beam 56 is also mechanically adjusted to the rear layer 32.

Once the laminated films are in the frame 50, the line speed of the laser writer or scanner 54 is set. The line speed is set 74 according to the power of the laser, the thickness of each film layer and according to the size of each pixel being written. The more powerful the laser the faster the writing speed can be, the thinner the film the faster the writing speed can be. The speed is set so that the film is heated by the absorbed laser light sufficiently to completely depolarize the film layer being targeted. For the film layers and laser writer or scanner 50 previously specified a writing speed of 0.5 Hz with a pixel spacing of 8 $\mu$m is sufficient.

Next, the image of the writing pattern for the rear layer 32 is loaded 76 into the computer 62. For example, an image of 10 by 10 squares of black and white pixels, covering an image size of 3,072 by 2,048 pixels, is loaded into the memory in a computer 62. Note that the squares could be as small as 1 by 1 pixel in size if desired, which provides the highest resolution spatial filter pattern, however, each square should be at least several pixels on a side to reduce vignetting effects.

Then the halfwave plate 58 in the laser beam path is oriented 78 at an angle of 45 degrees which will produce a horizontally polarized beam 56. The horizontally polarized beam will pass through the horizontally polarized layer 34 and be absorbed by the vertically polarized layer 32.

Then the image for the layer 32 is written 80 onto the filter 52 using amplitude or pulse modulation, depolarizing the rear half or rear layer 32 of the filter 52 in regions designated by the writing pattern, that is, wherever the computer image indicates white.

Next, the focus of the laser beam is changed to focus on the front layer 34. Alternately, the frame 50 can be moved further from the laser by 175 $\mu$m. This moves the focal plane of the laser beam 56 from the rear layer 32 to the front layer 34.

The halfwave plate 58 is then rotated 84 by 90 degrees, thereby changing the laser polarization to vertical. This will result in the horizontally polarized front layer 34 absorbing the laser beam 56.

The pattern for the front layer 34 is then loaded 86 into the memory of the computer 62. If the alternating pattern of FIG. 2 is to be produced in the filter, the checkerboard pattern in the memory is inverted (black to white and vice versa) and the inverse of the original pattern can be loaded. If a pattern such as in FIG. 1 is to be produced an appropriate pattern is loaded.

The new image is then written 88, depolarizing the front half or layer 34 of the filter 52 in the desired pattern while still in full registration with the previously written layer 32 of the filter 52. The result is a checkerboard of polarized regions alternating between vertical and horizontal polarization. Because the frame 50 has not been moved relative to the scanning axis of the scanner the polarized and depolarized regions of each layer are automatically in registered alignment with each other, resulting in a self registering or aligning process. To unpolarized light, the projection appears to neutrally have a low level of absorption but, upon viewing through a polarizer, the two polarizations are clearly visible as a black and white checkerboard.

The filter 52 can be attached to and aligned with a projection device. The filter can also be used in an application such as 3-D image projection as described in detail in the related application previously mentioned or as a spatially polarized light filter.

As can be seen from the above description, two orthogonally polarized filters are attached together by a process such as gluing or lamination at a sufficiently low temperature to avoid film depolarization. A polarized laser of a frequency which is absorbed by the polarizers in the orthogonal direction, but not in the direction parallel to laser radiation, and of sufficient intensity to thermally heat the absorbing layer to a point above the depolarization temperature, is used to selectively depolarize the polarizers. Either layer of film may be depolarized with spatial localization by changing the polarization of the incident laser with a half wave plate. The depolarization of the polarizer filter is due to local heating. The resulting filter consists of highly resolved local regions which are either partially or fully polarized in either polarization, completely unpolarized, or fully absorbing. When unpolarized light is passed through such a filter, the resulting transmitted light carries the spatial polarization information of the filter.

The present invention has been described with respect to providing a method and system for directly writing regions of alternating, mutually orthogonal polarizations. The alternating regions could also be polarized in alternating rotational polarizations, such as clockwise and counter clockwise elliptical polarizations. The present invention could also be produced by exposing the polarized films to light through a pair of masks having alternating transmission regions much like the method of exposing semiconductors through masks during semiconductor circuit construction.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

REFERENCE NUMBER LIST

8 Filter
10 Vertically polarized region
12 Horizontally polarized region
14,38 Depolarized region
16 Orthogonally polarized region (complete absorption)
20 Filter
30 Substrate
32 Layer
34 Layer
36 Polarized region
50 Translation frame
52 Filter
54 Laser scanner/writer system
56 Laser beam
58 Halfwave plate
60 Jig
62 Computer
63 Diode laser
64 Collimating lens
65,66 Beam shaping lens
67 Mirror
68 Galvonometer
69 Object lens
70–88 Process steps

What is claimed is:

1. A system for producing a filter, comprising:
    a frame holding the filter, the filter having regions in which different light polarizations can be depolarized; and
    a light scanner projecting a beam of changing polarization onto the filter in said frame to thermally depolarize the different polarizations of the regions to produce regions of different polarizations.

2. A system for producing a filter, comprising:
    a frame holding the filter, the filter having regions in which different light polarizations can be depolarized; and
    a light scanner projecting a beam of changing polarization onto the filter in said frame to thermally depolarize the different polarizations of the regions,
    wherein the filter comprises a first layer having a first polarization direction and a second layer having a second polarization direction, and said system further comprises a halfwave plate positioned between the filter and said scanner, separate from the filter and rotates the polarization of the beam selectively in the first and second polarization directions.

3. A system for producing a filter, comprising:
    a frame holding the filter, the filter having regions in which different light polarizations can be depolarized;
    a light scanner projecting a beam of changing polarization onto the filter in said frame to thermally depolarize the different polarizations of the regions and produce regions of different polarizations; and
    wherein the filter comprises a first layer having a first polarization direction and a second layer having a second polarization direction.

4. A method of producing a filter comprising the steps of:
    a) bonding two polarized film sheets to each other with their respective polarizations being orthogonal to each other; and
    b) scanning across selected portions of the bonded sheets with light beams of different polarizations to thermally depolarize the polarization of at least a portion of one of said two polarized film sheets so as to produce a filter having regions of different light polarization.

5. A method as recited in claim 4, wherein step b. comprises scanning with a first beam having a first polarization, first regions each having a first polarization which is depolarized and scanning with a second beam having a second polarization, second regions each having a second polarization which is depolarized.

6. A filter made by the method of claim 4.

* * * * *